United States Patent [19]

Bosio

[11] Patent Number: 5,331,997
[45] Date of Patent: Jul. 26, 1994

[54] FLOW CONTROL DEVICE FOR A SINGLE-CONTROL MIXER CARTRIDGE PARTICULARLY SUITABLE FOR A BATHTUB UNIT

[75] Inventor: Orlando Bosio, Casaloldo, Italy

[73] Assignee: Amfag S.r.l., Castelgoffredo, Italy

[21] Appl. No.: 67,917

[22] Filed: May 27, 1993

[30] Foreign Application Priority Data

Jun. 1, 1992 [IT] Italy .................. MN92A000015

[51] Int. Cl.⁵ .......................................... F16K 11/074
[52] U.S. Cl. ........................ 137/270; 137/625.17; 137/625.4
[58] Field of Search ............ 137/270, 625.17, 625.4, 137/625.41

[56] References Cited

U.S. PATENT DOCUMENTS

| | | | |
|---|---|---|---|
| 4,584,723 | 4/1986 | Hussauf | 137/270 X |
| 4,621,659 | 11/1986 | Pawelzik | 137/625.17 |
| 4,676,270 | 6/1987 | Knapp et al. | 137/270 X |
| 4,804,011 | 2/1989 | Knapp | 137/625.4 X |
| 4,856,556 | 8/1989 | Mennigmann | 137/625.17 X |
| 4,942,902 | 7/1990 | Knapp | 137/270 X |
| 4,971,113 | 11/1990 | Pawelzik et al. | 137/625.17 |
| 4,995,419 | 2/1991 | Pawelzik et al. | 137/625.17 X |
| 4,997,005 | 3/1991 | Pawelzik et al. | 137/625.17 |
| 5,080,134 | 1/1992 | Orlandi | 137/625.17 |
| 5,111,842 | 5/1992 | Knapp | 137/625.17 X |

FOREIGN PATENT DOCUMENTS 9112021 12/1991 Fed. Rep. of Germany.

Primary Examiner—John Rivell
Attorney, Agent, or Firm—Guido Modiano; Albert Josif; Daniel O'Byrne

[57] ABSTRACT

The device has a disk provided with two holes for the inflow of hot and cold water and with a hole for the outflow of hot, cold or mixed water. The disk has two faces: a first face which faces the cartridge, and a second face provided with an adjacent tunnel which connects the outflow hole formed in the disk to at least one well outflow opening, and forms two separate chambers for the inflow of hot and cold water respectively.

13 Claims, 7 Drawing Sheets

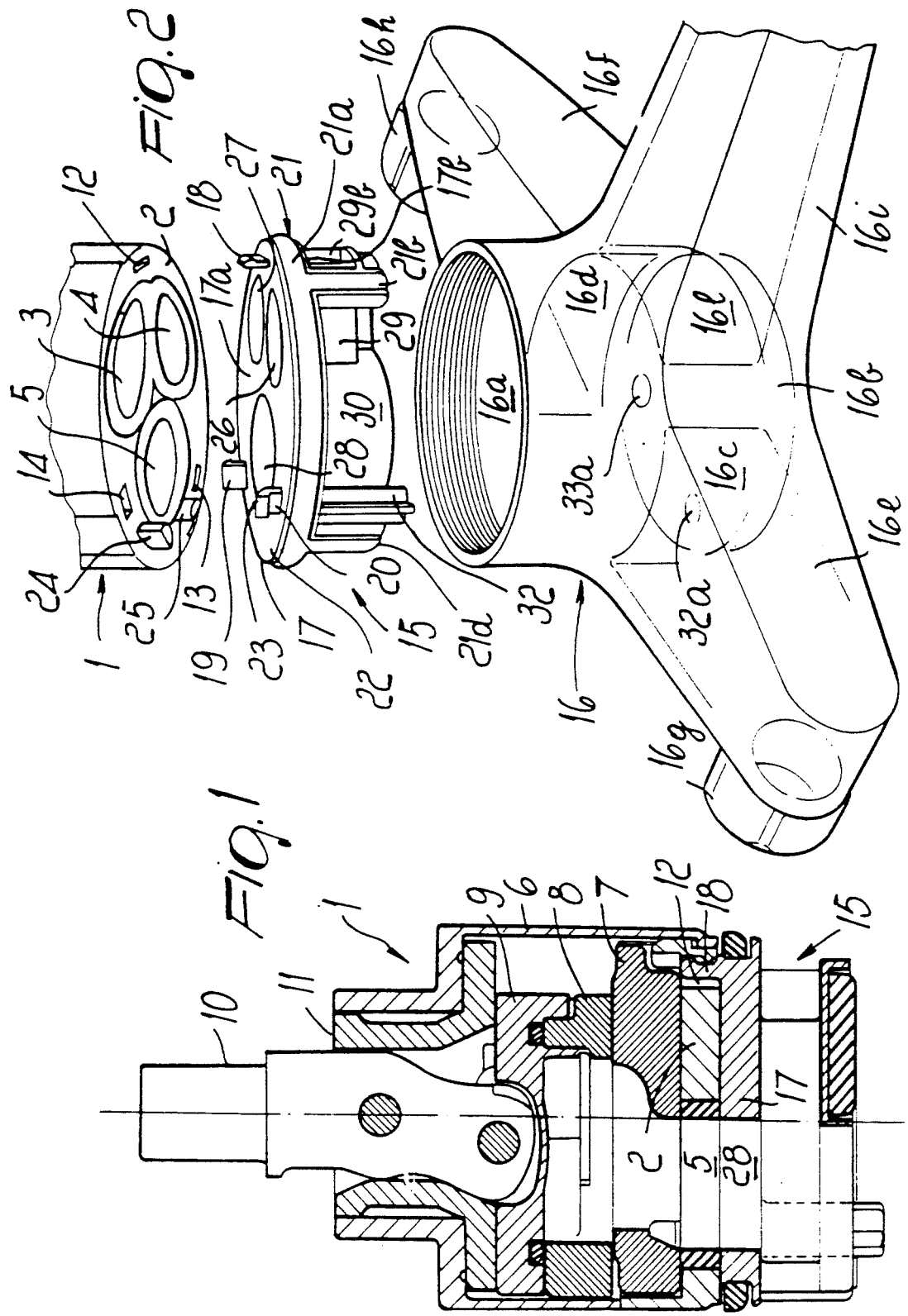

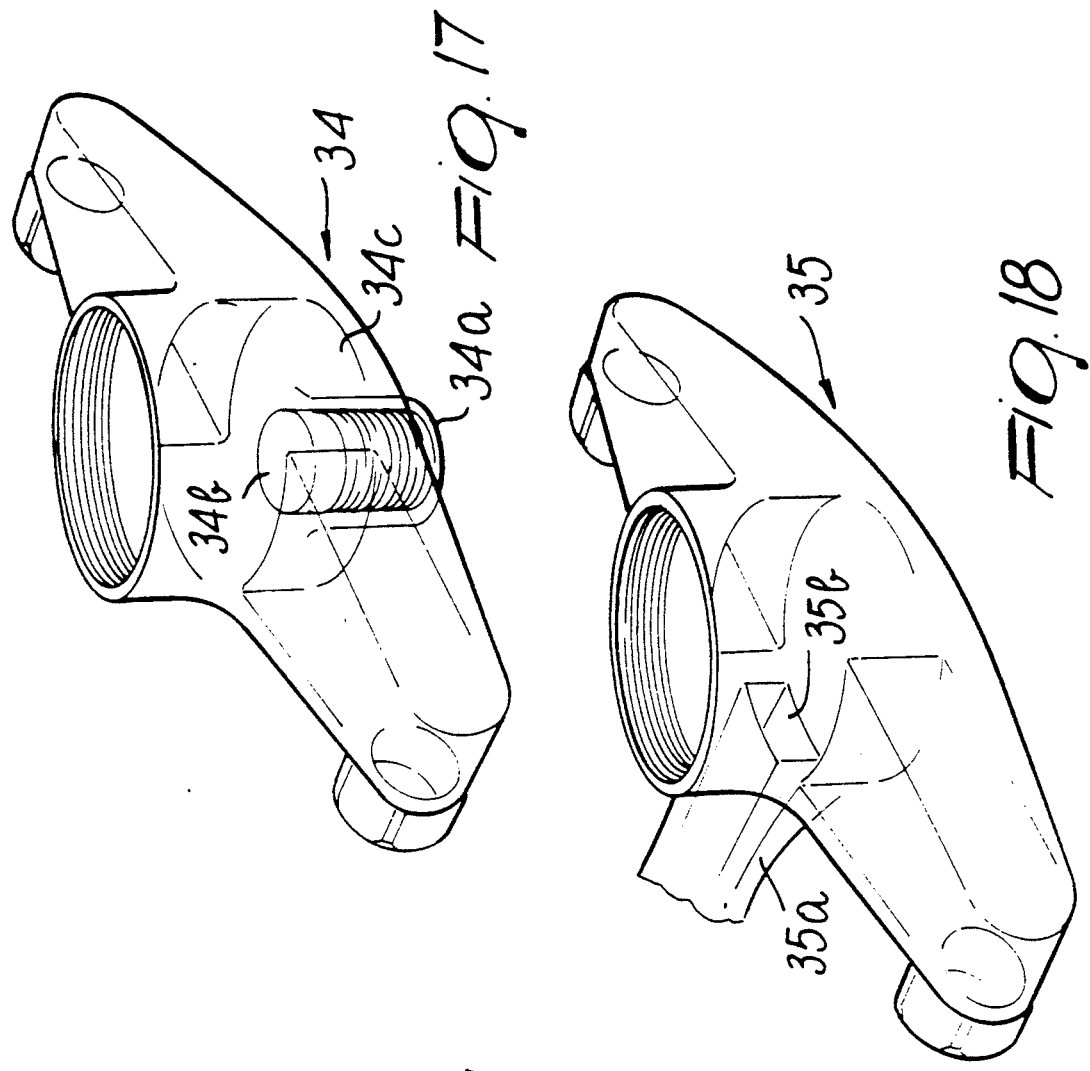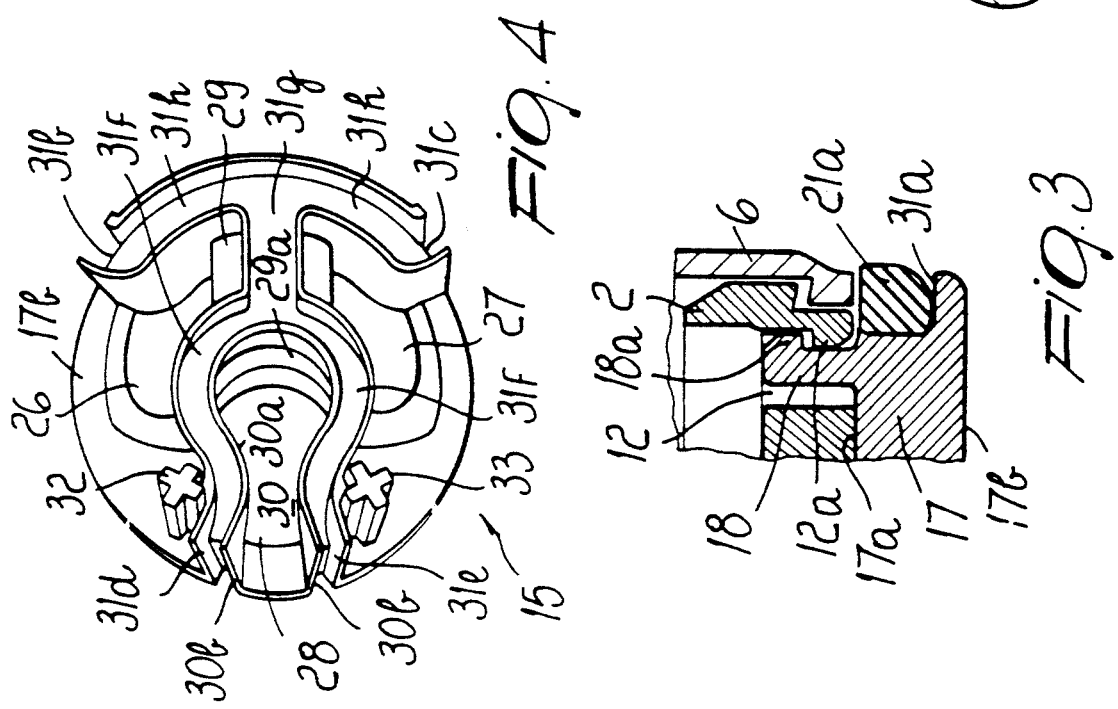

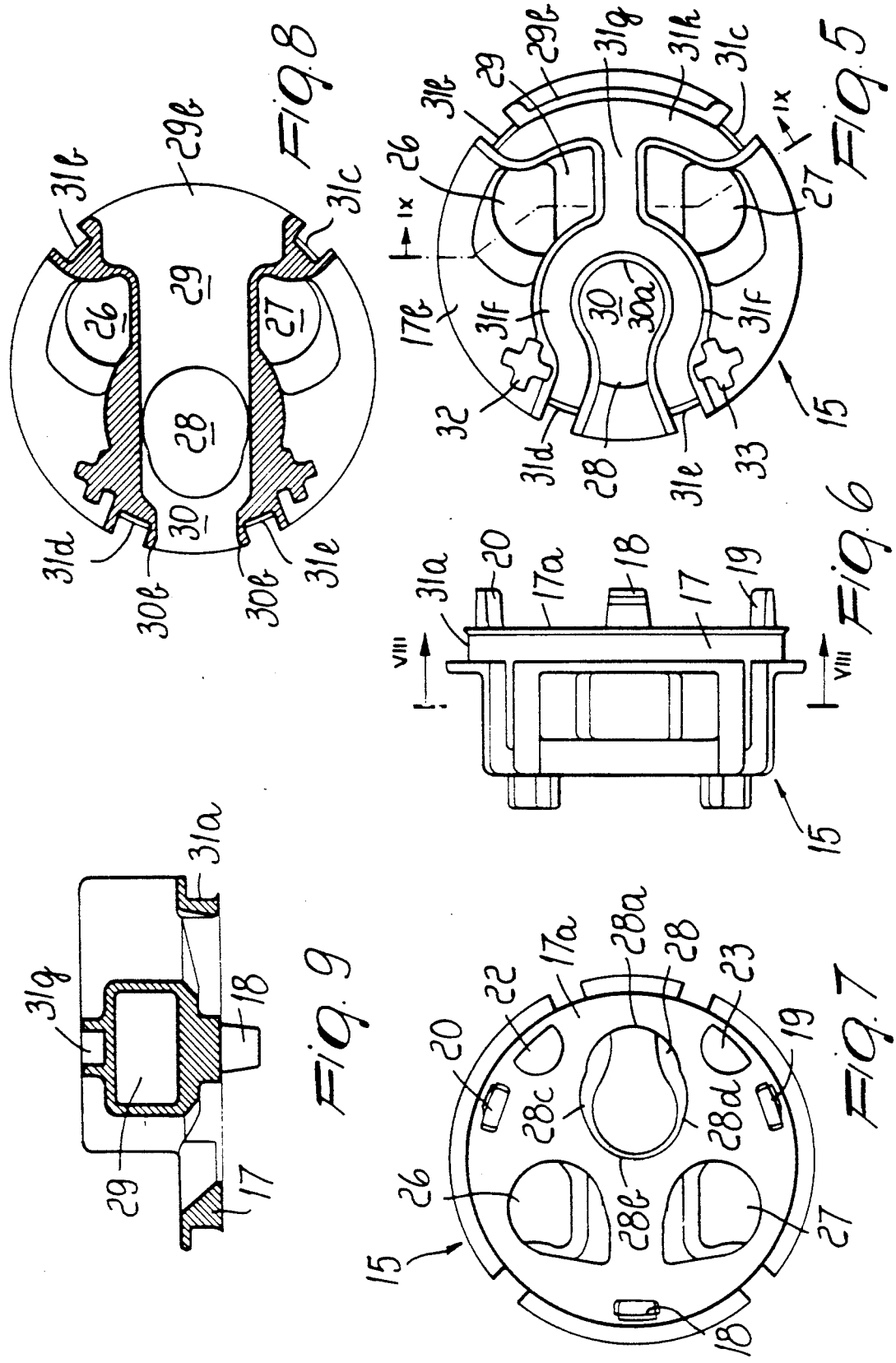

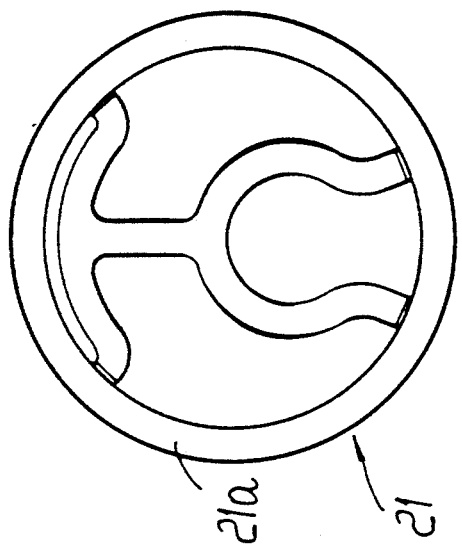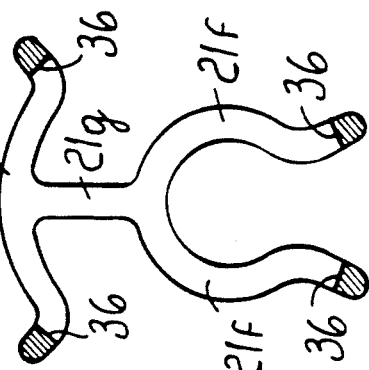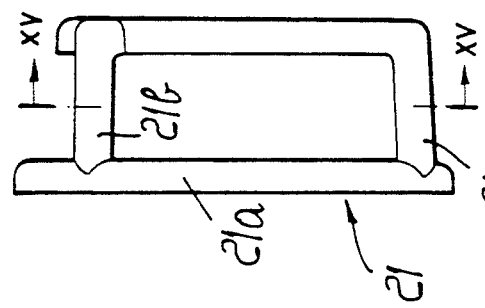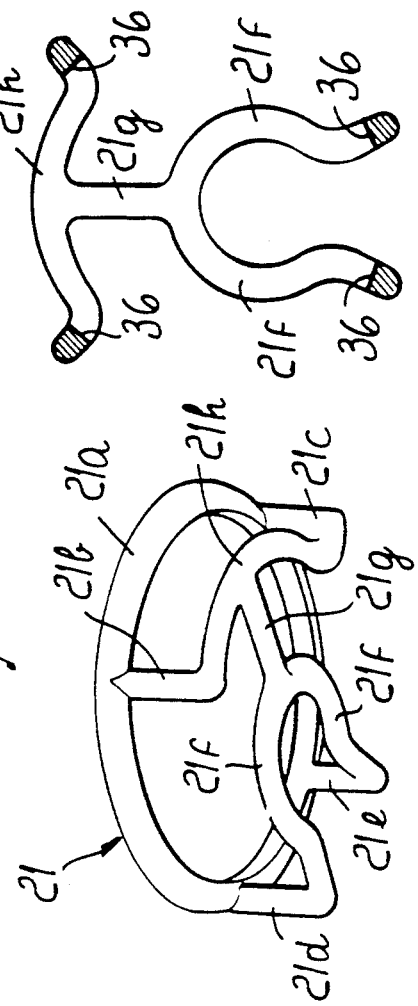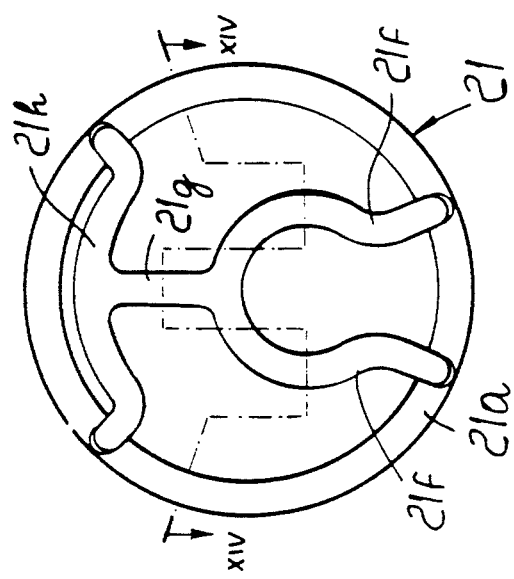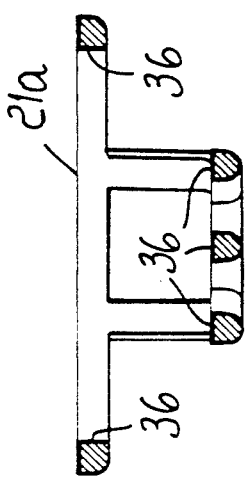

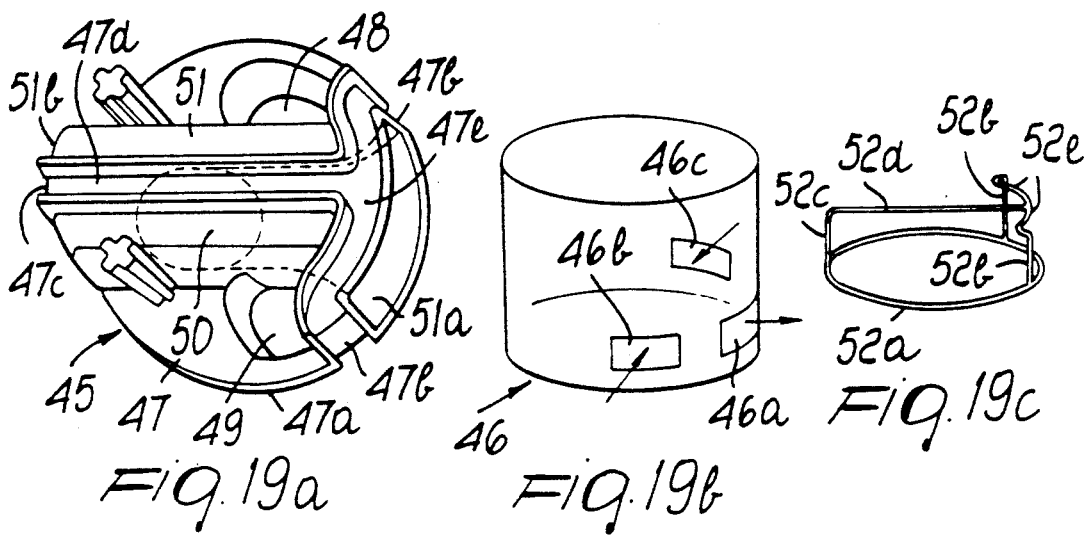
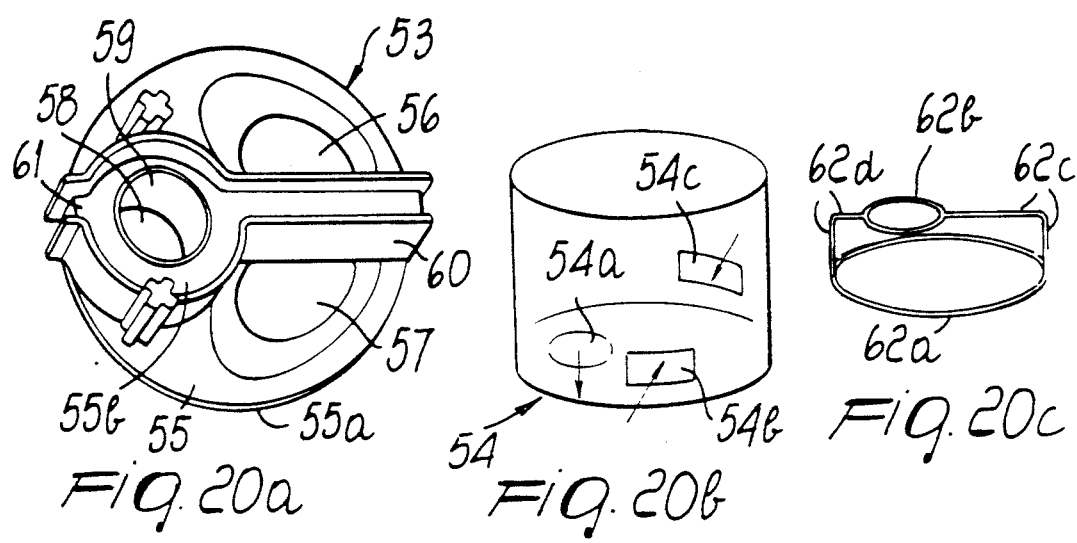
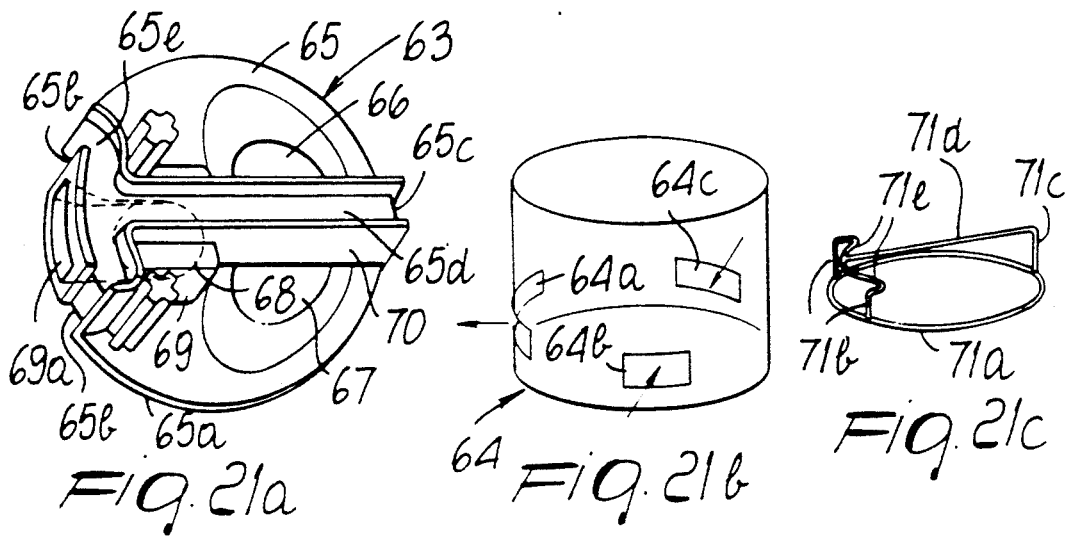

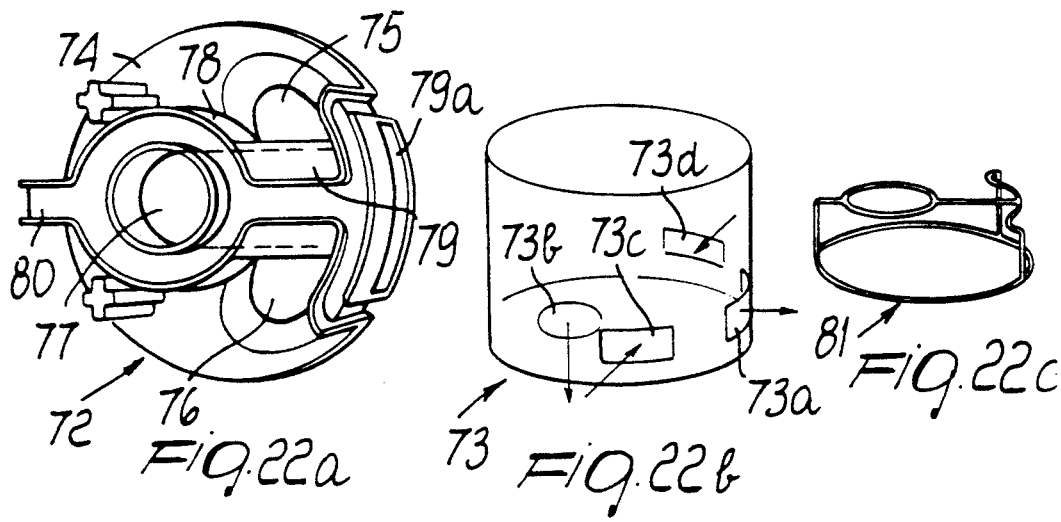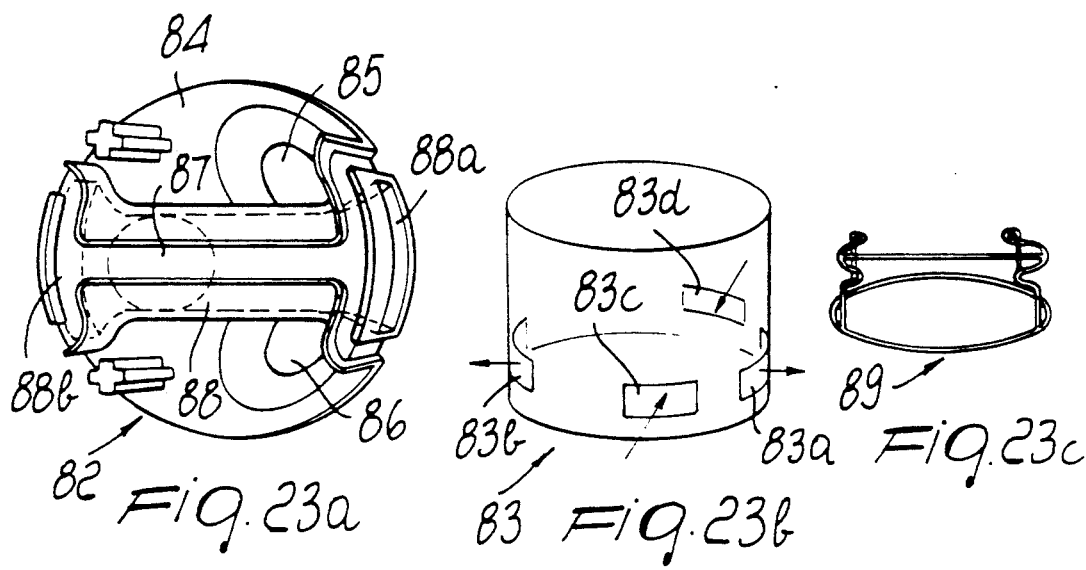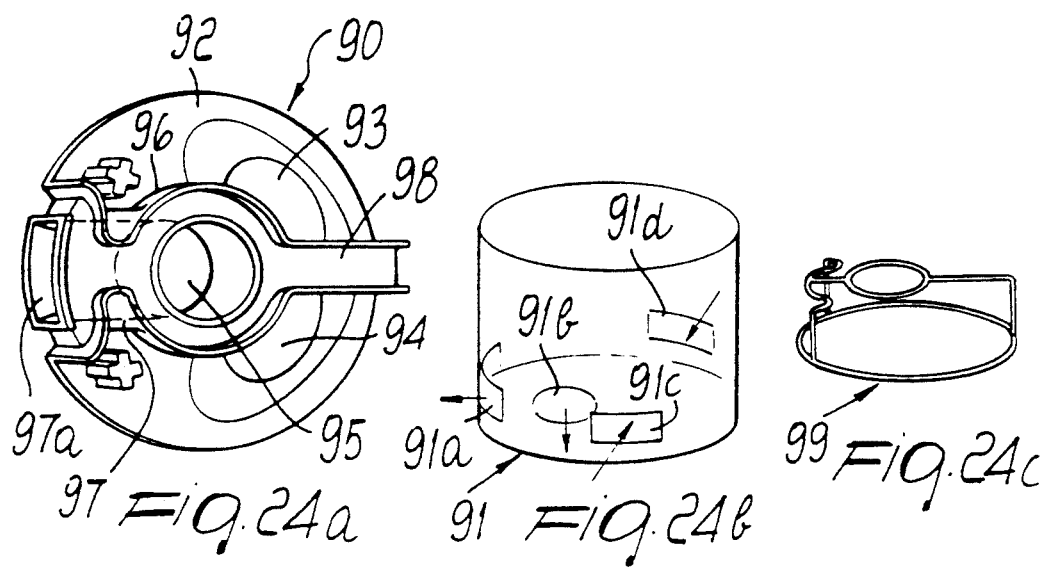

FLOW CONTROL DEVICE FOR A SINGLE-CONTROL MIXER CARTRIDGE PARTICULARLY SUITABLE FOR A BATHTUB UNIT

BACKGROUND OF THE INVENTION

The present invention relates to a flow control device for the separate inflow of hot and cold water and for the outflow of hot, cold or mixed water in a single-control mixer cartridge particularly suitable for a bathtub unit.

In the field of faucets, widespread use is made of devices known as single-control mixer cartridges. These devices are inserted in faucets of all kinds and in bathtub units and the like and allow, by maneuvering a single actuation lever, both to vary the delivered flow-rate from zero to a maximum value and to vary the temperature of the water by appropriately mixing the hot water and the cold water supplied to the faucet.

Known embodiments of mixer cartridges and of any accessories thereof are such that they lead to complicated shapes of the bathtub units in which said cartridges must be inserted, and this fact constitutes a disadvantageous characteristic, since it adversely affects the cost of bathtub units and also negatively effects their functionality, creating water passages which are anything but ideal in terms of fluid-dynamics characteristics.

SUMMARY OF THE INVENTION

The aim of the present invention is thus to provide a device which, in different embodiments, is such as to allow extreme simplification of the shape of the bathtub unit in which it is inserted.

The intended aim is achieved by a device for the separate inflow of hot and cold water and for the outflow of hot, cold or mixed water in a single-control mixer cartridge particularly suitable for a bathtub unit, according to the invention, said bathtub unit comprising a cavity for accommodating said cartridge which is shaped like a well with a cylindrical side wall and a flat base and has, at its side wall, outlets of ducts for the inflow of hot and cold water respectively, said cavity being furthermore provided with at least one outflow opening for hot, cold or mixed water, characterized in that it comprises a disk which is provided with holes for the inflow of hot and cold water respectively into the cartridge, and with a hole for the outflow of hot, cold or mixed water, and has two faces, the first face being substantially flat and arrangeable facing the cartridge, the second face being adjacently provided with a tunnel for connecting the outflow hole present in the disk to the at least one opening for the outflow of hot, cold or mixed water from the well, said tunnel forming two separate chambers together with portions of the side wall and of the base of the well; the well outlet of the hot water inflow duct and the hole for the inflow of hot water into the cartridge present in the disk are formed in the first chamber, and the well outlet of the cold water inflow duct and the hole for the inflow of cold water into the cartridge present in the disk are formed in the second chamber; a gasket comprising a circumferential part at the peripheral region of the disk and contacting the side wall of the well; portions extend monolithically from said circumferential part, and are inserted in seats formed on the walls of the tunnel and contact said side wall and the base of the well to delimit said two separate chambers; registration pins extend from said second face of the disk to fit in seats provided in the base of the well.

BRIEF DESCRIPTION OF THE DRAWINGS

Further characteristics and advantages will become apparent from the description of some preferred but not exclusive embodiments of the invention, illustrated only by way of non-limitative example in the accompanying drawings, wherein:

FIG. 1 is a sectional view of a mixer cartridge provided with the device according to the invention;

FIG. 2 is a partially exploded view of the cartridge of FIG. 1 and of a bathtub unit in which it is suitable to be inserted;

FIG. 3 is a detail view of the coupling of the device according to the invention to the bottom of the cartridge;

FIG. 4 is a perspective view of the device according to the invention, without the gasket, seen from the side directed toward the base of the well;

FIGS. 5, 6 and 7 are three orthographic views of the device according to the invention, without the gasket;

FIG. 8 is a sectional view, taken along the plane VIII—VIII of FIG. 6;

FIG. 9 is a sectional view, taken along the plane IX—IX of FIG. 5;

FIG. 10 is a perspective view of the gasket;

FIGS. 11, 12 and 13 are three orthographic views of the gasket;

FIG. 14 is a sectional view, taken along the plane XIV—XIV of FIG. 11;

FIG. 15 is a sectional view, taken along the plane XV—XV of FIG. 12;

FIGS. 17 and 18 are views of two embodiments of a bathtub unit which are different from the one shown in FIGS. 2 and 16;

FIG. 19a is a perspective view of another embodiment of the device according to the invention, configured as a supplemental bottom for installation in a bathtub unit of the type illustrated in FIG. 2;

FIG. 19b is a schematic perspective view of a well of a bathtub unit in which the device of FIG. 19a is installable;

FIG. 19c is a schematic perspective view of a gasket for sealing the device of FIG. 19a in a well of the type illustrated in FIG. 19b;

FIG. 20a is a perspective view of another embodiment of the device according to the invention, configured as a supplemental bottom installable in a bathtub unit of the type having a well defining a base having a water outlet formed therein, and a side wall having hot and cold water inflow openings formed therein;

FIG. 20b is a schematic perspective view of a well of a bathtub unit in which the device of FIG. 20a is installable;

FIG. 20c is a schematic perspective view of a gasket for sealing the device of FIG. 20a in a well of the type illustrated in FIG. 20b;

FIG. 21a is a perspective view of a further embodiment of the device according to the invention, configured as a supplemental bottom installable in a bathtub unit of the type having a well defining a side wall having a rear water outlet opening and hot and cold water inflow openings formed therein;

FIG. 21b is a schematic perspective view of a well of a bathtub unit in which the device of FIG. 21a is installable;

FIG. 21c is a schematic perspective view of a gasket for sealing the device of FIG. 21a in a well of the type illustrated in FIG. 21b;

FIG. 22a is a perspective view of another embodiment of the device according to the invention, configured as a supplemental bottom installable in a bathtub unit of the type having a well defining a base having a water outlet formed therein, and a side wall having hot and cold water inflow openings and a front water outlet formed therein;

FIG. 22b is a schematic perspective view of a well of a bathtub unit in which the device of FIG. 22a is installable;

FIG. 22c is a schematic perspective view of a gasket for sealing the device of FIG. 22a in a well of the type illustrated in FIG. 22b;

FIG. 23a is a perspective view of a further embodiment of the device according to the invention, configured as a supplemental bottom installable in a bathtub unit of the type having a well defining a side wall having hot and cold water inflow openings and front and rear water outflow outlets formed therein;

FIG. 23b is a schematic perspective view of a well of a bathtub unit in which the device of FIG. 23a is installable;

FIG. 23c is a schematic perspective view of a gasket for sealing the device of FIG. 23a in a well of the type illustrated in FIG. 23b;

FIG. 24a is a perspective view of another embodiment of the device according to the invention, configured as a supplemental bottom installable in a bathtub unit of the type having a well defining a base having a water outlet formed therein, and a side wall having hot and cold water inflow openings and a rear water outlet formed therein;

FIG. 24b is a schematic perspective view of a well of a bathtub unit in which the device of FIG. 24a is installable;

FIG. 24c is a schematic perspective view of a gasket for sealing the device of FIG. 24a in a well of the type illustrated in FIG. 24b.

DESCRIPTION OF THE PREFERRED EMBODIMENTS

Figure 16:
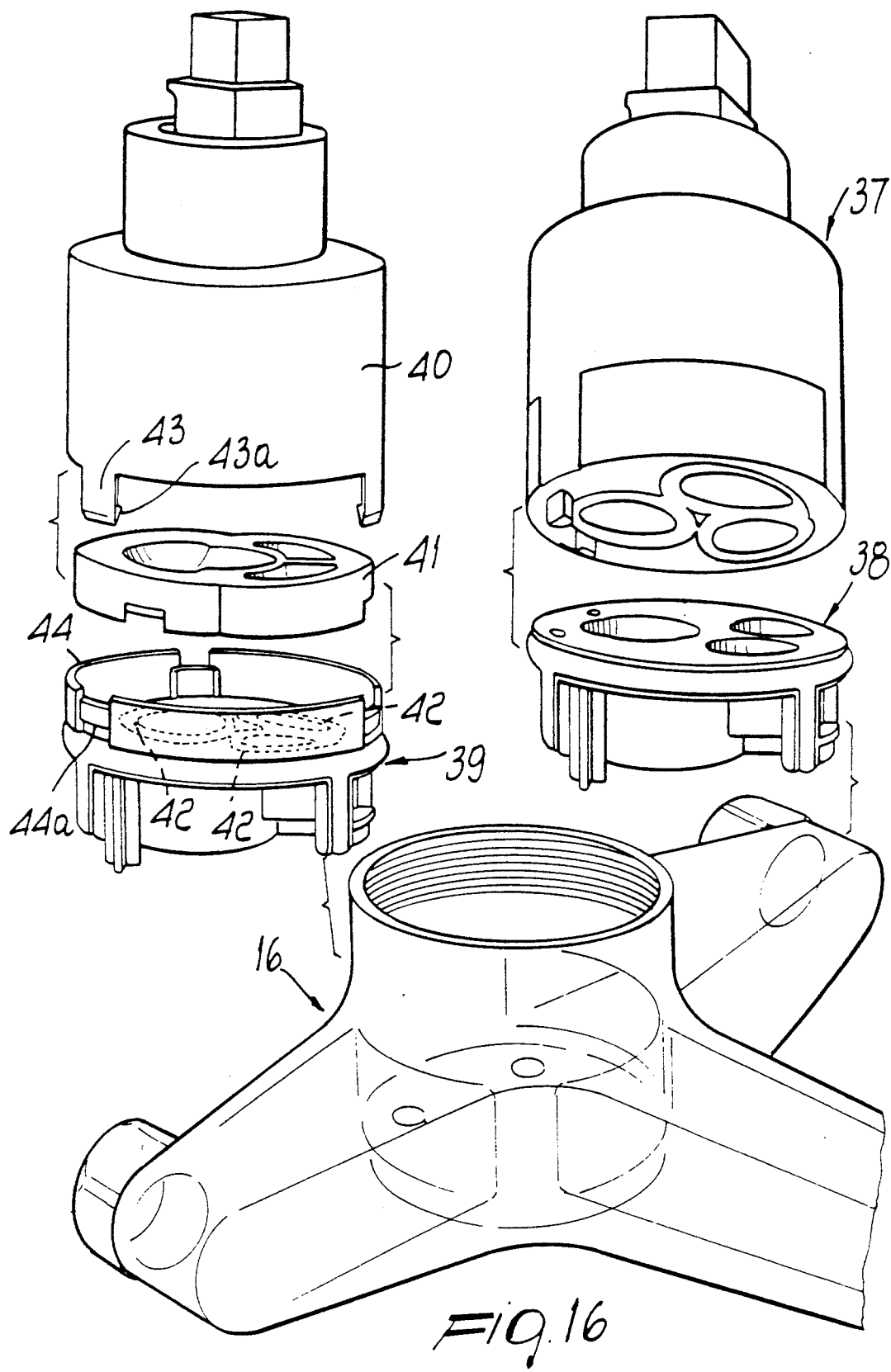
FIG. 16 is a perspective view, on the right and on the left respectively, of two variations of the device according to the invention, with the related cartridges shown partially exploded, suitable for insertion in the bathtub unit shown at the bottom.

With reference to the above FIGS. 1 to 15, the numeral 1 generally designates a mixer cartridge of the type described and claimed in the U.S. patent application Ser. No. 08/053,274 in the name of the same Applicant, and incorporated herein by reference.

Said cartridge comprises the bottom 2, which is provided with the openings 3 and 4 for the separate inflow of hot and cold water and with the opening 5 for the outflow of hot, cold or mixed water; all of said openings are provided with related gaskets, and the body 6 is associated with said bottom so as to delimit a portion of space which contains a fixed plate 7, which is made of ceramic material and is provided with holes which match the openings of the bottom, and a movable plate 8, which is also made of ceramic material, internally forms a mixing chamber and is associated, with the plate cover 9 interposed, with the actuation lever 10 which is pivoted on the rotatable connector 11; it is thus possible to make the movable plate assume different positions with respect to the fixed plate, and it is well-known that the flow-rate is changed by moving the lever about its own fulcrum, whereas the temperature of said water is changed by rotating the connector.

The described cartridge 1 is excellently suited for being inserted in flush-mount faucets for bathtubs and showers, but a main characteristic thereof is the fact that it is provided, at the bottom 2, with the slots 12, 13 and 14, which have teeth, such as 12a for the slot 12, which constitute means for the stable coupling of a supplemental bottom which converts the cartridge so as to make it particularly suitable for insertion in faucets of a different kind.

The device according to the invention, generally designated by the reference numeral 15, is therefore configured, at least in its first embodiment which is now described, as an actual supplemental bottom to be fitted onto the cartridge 1 to allow the insertion of said cartridge in a bathtub unit such as the one designated by the reference numeral 16, which has an extremely simplified shape with respect to known bathtub units and is described and claimed in a co-pending U.S. patent application filed in the name of the same Applicant.

In other words, it is sufficient to stably fit, as described hereinafter, the supplemental bottom 15 onto the cartridge 1 in order to obtain the converted cartridge which is shown in full in the sectional view of FIG. 1 and is suitable for insertion in the bathtub unit 16.

Said bathtub unit 16 has, as mentioned, an extremely simple structure: it in fact comprises the well for accommodating the mixer cartridge, which is shaped so as to form the cylindrical wall 16a with a flat base 16b and in which the ducts 16e and 16f for the supply of hot and cold water, drawn respectively from the connectors 16g and 16h, end at the openings 16c and 16d formed in said wall.

The numeral 16i furthermore designates the duct for the outflow of hot, cold or mixed water from the unit; said duct extends from the opening 16l formed in the side wall 16a, at a portion designated as being the front portion because it is opposite to the supply connectors 16g and 16h; the portion of the side wall 16a which is directed toward said connectors is designated as the rear portion hereinafter.

Moving on to describe in detail the device 15 according to the invention, it is noted that it comprises the disk 17, which has two flat faces 17a and 17b; the three legs 18, 19 and 20 extend from the first face and are provided with teeth, such as 18a for the leg 18, which are suitable to fit respectively in the slots 12, 13 and 14 of the bottom of the cartridge for stable snap-action engagement produced by the teeth such as 12a with the teeth such as 18a.

The device 15 is provided with a gasket, generally designated by the reference numeral 21, which is shown assembled in FIG. 2 and is shown in FIGS. 10 to 15; said gasket is described in detail hereinafter, and is provided with the cavities 22 and 23 for accommodating respectively the registration pins 24 and 25 which extend from the bottom 2 of the cartridge 1; said cavities have a side wall which is complementary, along its entire extension, to the side wall of said pins, and are separated from the edge of the disk by thin walls.

The disk 17 is provided with holes 26 and 27 at the openings 3 and 4 for the separate inflow of hot and cold water which are present in the bottom 2 of the cartridge, and with a hole 28 at the opening 5 which is provided in said bottom 2 for the outflow of hot, cold or mixed water.

In particular, the holes 26 and 27 have, at the surface 17a, teardrop-shaped cross-sections clearly visible in FIG. 7; said cross-sections are complementary to the internal perimeter of the gaskets of the openings 3 and 4, which are shaped as described in the U.S. patent application Ser. No. 08/053,274 incorporated herein by reference; the hole 28 has a constant cross-section with a perimeter which duplicates the perimeter of the gasket of the opening 5, which is shaped so as to form two circular arcs 28a and 28b which are radiused by means of two further arcs 28c and 28d.

Adjacently to the face 17b, the disk 17 is provided with the tunnel into which the outflow hole 28 leads; said hole 28 comprises the two diametrical aligned portions 29 and 30.

The portion 29 is fully delimited by walls between the inflow section 29a, clearly shown in FIG. 4, and the outflow section 29 b toward the front portion of the side wall 16a of the well, clearly shown in FIGS. 2, 5 and 8.

The portion 30 has an opening toward the base 16b of the well which is delimited by the edge 30a and ends, with the section delimited by the edges 30b, toward the rear portion of the side wall 16a of the well.

The gasket, designated by the reference numeral 21, has a circumferential part 21a arranged in the seat 31a at the peripheral region of the disk 17 and makes contact with the side wall 16a of the well; the portions 21b and 21c are arranged respectively in seats 31b and 31c present at the edges of the tunnel outlet section 29 b which are perpendicular to the disk 17 toward the front portion of the side wall 16a; the portions 21d and 21e are arranged respectively in seats 31d and 31e present at the edges of the tunnel outlet section toward the rear portion of the side wall 16a; the portion 21f is arranged in the seat 31f present at the edge 30a, and finally; the portions 21g and 21h are arranged respectively in the seats 31g and 31h present on the face of the tunnel portion 29 directed toward the base 16b of the well, and all extend monolithically from said circumferential part.

Finally, the registration pins 32 and 33 extend from the face 17b of the disk 17; said pins fit in seats 32a and 33a in the base 16b of the well to ensure the correct placement of the cartridge therein.

When the cartridge, in the position shown in FIG. 1 and thus complete with the device 15, is inserted in the well of the bathtub unit 16, the described gasket makes contact with the wall 16a and with the base 16b, forming two isolated chambers.

The first chamber is delimited as follows: by the wall portion 16a, which is in turn delimited by the gasket portions 21b and 21d and by the part of the portion 21a which is comprised between said gasket portions; by the base portion 16b, which is in turn delimited by the gasket portion 21g, by the part of the portion 21f which is comprised between the portion 21d and said portion 21g, and by the part of the portion 21h which is comprised between the portions 21g and 21b and; by the tunnel walls 29 and 30 which face said wall portion 16a; and by the disk portion 17 which faces said base portion 16b.

The opening 16c for the inflow of hot water leads into this chamber, and so does the hole 26 which allows the flow of said hot water into the cartridge inflow opening 3.

In a similar manner, a second chamber is delimited on the opposite side of the tunnel; the cold water supply opening 16d leads into said second chamber, and the hole 27 which allows said cold water to flow to the cartridge inflow opening 4 leads into this chamber.

The hot, cold or mixed water which flows out of the opening 5 provided in the bottom 2 of the cartridge enters the hole 28 which is connected to the tunnel 29 and 30, fully isolated with respect to the above described chambers, and flows out of the single outlet section of said tunnel, which encounters a corresponding well outflow opening; in this case, the opening is the section 29 b, which is arranged at the opening 161 which provides access to the front outflow duct 16i.

The excellent functionality of the invention is evident from what has been described; it allows to convey hot and cold water separately to the respective inlets into the mixer cartridge and to collect the hot, cold or mixed water at the outlet of the cartridge, conveying it to the outlet in a bathtub unit which has an extremely simplified shape.

The device according to the invention continues to perform its function excellently even when it is inserted in a bathtub unit in which the outlet is arranged in a position different from that provided in the described unit 16.

This is the case, for example, of the bathtub unit 34 shown in FIG. 17, wherein the only difference with respect to the unit 16 consists of the fact that the hot, cold or mixed water flows out by means of the duct 34a, which leads into the opening 34b in the base 34c of the well; it is also the case of the bathtub unit 35 shown in FIG. 18, wherein the water flows out by means of the duct 35a, which leads into the opening 35b in the rear portion of the side wall.

In the first case, the water flows from the tunnel to the outflow opening 34b through the opening of the portion 30 of said tunnel which is delimited by the edge 30a, whereas in the second case the water reaches the outflow opening 35b by flowing through the outlet section delimited by the edges 30b.

The described embodiment 15 of the device according to the invention is thus universal, fully performing its function even in the case of a bathtub unit which has any combination whatever of the described outlets.

When it is necessary to extract the cartridge from the faucet for maintenance or replacement, the stability of the connection between the bottom 2 and the device 15 ensures the simultaneous extraction of said device as well, fully freeing the well for accommodation within the bathtub unit.

Before describing some variations of the invention, it is appropriate to consider a characteristic of the gasket 21 which is highly relevant as regards its manufacture; this characteristic is constituted by the fact that all the walls 36 shown in FIGS. 14 and 15, which contact the bottom of the seats and the circumferential edge of the disk 17, belong to a single ideal frustum-shaped surface which corresponds to the smooth frustum-shaped surface of a punch which acts in combination with a gasket forming mold in which a complementary impression of the other walls, shaped so as to allow extraction from the mold, is formed.

Two variations of the invention are now described with reference to FIG. 16; these variations relate to its shape on the face of the disk which is meant to face the cartridge, whereas the tunnel provided at the opposite face and the related gasket are perfectly identical to those of the described embodiment 15.

A cartridge 37 with a flat bottom is shown on the right in the figure; said cartridge is per se suitable to be inserted in flush-mounted faucets for bathtubs and showers and has no devices for coupling a supplemental bottom at its bottom; in this case, the device to be associated with said cartridge to allow its insertion in the bathtub unit 16, or indifferently in the bathtub units 34 and 35, is the one designated by the reference numeral 38, which is fully identical to the embodiment 15 described above, with the only exception that the legs 18, 19 and 20 have been eliminated.

A variation of the invention, designated by the reference numeral 39, is shown on the left in FIG. 16; this embodiment is an integral part of a mixer cartridge by constituting its bottom; said cartridge comprises the body 40, which contains the well-known elements above the fixed plate 41, and is provided with means for stable coupling to said device 39, which thus adheres to said fixed plate and consequently has gaskets 42 at the edges of the water flow holes which are provided in the disk.

In the described variation, said stable coupling means comprise legs, such as 43, provided with a tooth 43a which is suitable to associate, in a snap-together manner, with the tooth 44a formed in the wall 44 which extends from the disk of the device; however, said coupling means can obviously assume any configuration.

It is furthermore noted that the wall 44 can extend axially so that it contains various elements above the fixed plate, consequently shortening the body 40, which in practice would act as a lid.

FIGS. 19 to 24 illustrate six variations of the invention related to the shape of the tunnel which extends from the face of the disk directed toward the base of the accommodation well; the opposite face of the disk may indifferently assume the shape of one of the embodiments described earlier and designated by the reference numerals 15, 38 and 39 respectively.

These six variations are not universal like the embodiment 15, which has been shown to adapt to the front-outlet bathtub unit 16, to the bathtub units 34 and 35 which respectively have a base outlet and a rear outlet, and to bathtub units which have outlets constituted by any combination of these three outlets; instead, each variation is suitable to fit exclusively in a very specific type of bathtub unit.

FIG. 19 is a view of a variation 45 of the device which is exclusively suitable for a bathtub unit with a front outlet 46a located on the side wall of the well 46, in which the inflow openings for hot and cold water, respectively 46b and 46c, are also formed; in other words, it is a bathtub unit of the type previously designated by the reference numeral 16.

The two holes 48 and 49 for the inflow of hot and cold water respectively, and the hole 50 for the outflow of hot, cold or mixed water are formed in the disk 47 of this variation; the hole 50 leads into the diametrical tunnel 51, which is open only at the section 51a which arranges itself so that it faces the opening 46a; in the variation shown in the figure, the tunnel 51 has a substantially constant cross-section, but it is evident that its part which runs from the hole 50 to the closure wall 51b might be replaced with a terminal portion shaped like a simple wall.

The gasket that delimits the hot water inflow chamber, in which the opening 46b and the hole 48 are formed, and the cold water inflow chamber, in which the hole 46c and the hole 49 are formed, comprises: the circumferential portion 52a, suitable to be located at the peripheral region 47a of the disk 47; the portions 52b, suitable to be located in the seats 47b at the edges of the section 51a which are perpendicular to the disk; the portion 52c, which is located in the seat 47c on the wall 51b; and the portions 52d and 52e, which are located in the seats 47d and 47e on the face of the tunnel which is directed toward the base of the well.

FIG. 20 is a view of a variation 53 of the invention which is exclusively suitable for a bathtub unit with an outlet 54a located at the base of the well 54; the hot water inflow opening 54b and the cold water inflow opening 54c are formed respectively in the side wall of said well, and this is a bathtub unit of the type previously designated by the reference numeral 34.

The two holes 56 and 57 for the inflow of hot and cold water respectively, and the hole 58 for the outflow of hot, cold or mixed water are formed in the disk 55 of this variation; the tunnel 59 is shaped like a duct for the direct connection of said hole 58 to said opening 54a and is flanked by the two diametrical walls 60 and 61 up to the peripheral region of the disk.

The gasket that delimits the hot water inflow chamber, in which the opening 54b and the hole 56 are formed, and the cold water inflow chamber, in which the opening 54c and the hole 57 are formed, comprises: the circumferential portion 62a, located at the peripheral region 55a of the disk; the portion 62b, located in the seat 55b at the end of the tunnel; and the portions 62c and 62d, located in the seats formed respectively on the faces of the wall 60 and of the wall 61.

FIG. 21 is a view of a variation 63 of the invention which is exclusively suitable for a bathtub unit with a rear outlet 64a located on the side wall of the well 64; the inflow openings 64b and 64c for hot and cold water respectively are also formed in said wall, and this is a bathtub unit of the type previously designated by the reference numeral 35.

The disk 65 of this variation is provided with the two holes 66 and 67 for the inflow of hot and cold water respectively, and with the hole 68 for the outflow of hot, cold or mixed water, which leads into the tunnel 69; said tunnel is open only at the section 69a which faces the opening 64a, and the numeral 70 furthermore designates a diametrical wall which is continuous with respect to the tunnel 69.

The gasket that delimits the hot water inflow chamber, in which the opening 64b and the hole 66 are formed, and the cold water inflow chamber, in which the opening 64c and the hole 67 are formed, comprises: the circumferential portion 71a, suitable to be located at the peripheral region 65a of the disk 65; the portions 71b, located in the seats 65b at the edges of the section 69a which are perpendicular to the disk; and the portions 71c, 71d and 71e, located in the seats 65c, 65d and 65e respectively.

FIG. 22 is a view of a variation 72 of the invention which is exclusively suitable for a bathtub unit with a front outlet 73a and an outlet located at the base 73b of the well 73; hot water and cold water enter said well from the openings 73c and 73d respectively.

The holes 75 and 76 for the inflow of hot water and cold water respectively, and the hole 77 for the outflow of hot, cold or mixed water are formed in the disk 74; said hole 77 ends in the tunnel, and said tunnel comprises a portion 78, which is shaped so as to form a duct for direct connection to the opening 73b, and a portion 79 which leads into the section 79a which faces the opening 73a; the numeral 80 furthermore designates a terminal shaped like a wall which flanks the portion 78 of the tunnel up to the peripheral region of the disk.

The gasket 81 of this variation is obtained by combining the gaskets of FIGS. 19 and 20; detailed description thereof is thus deemed unnecessary.

FIG. 23 illustrates a variation 82 suitable for a bathtub unit with a front outlet 83a and a rear outlet 83b located at the side wall of the well 83; said well receives hot and cold water in 83c and 83d respectively.

The holes 85 and 86 for the inflow of hot and cold water respectively, and the hole 87 for the outflow of hot, cold or mixed water are formed in the disk 84 of this variation; the hole 87 leads into the tunnel 88, which is arranged diametrically between the outlet sections 88a and 88b which respectively face the openings 83a and 83b.

The gasket 89 of this variation is obtained by combining the gaskets of FIGS. 19 and 21, and therefore it is not described in detail.

FIG. 24 illustrates the variation 90, which is exclusively suitable for a bathtub unit with an outlet 91a located at the rear region of the side wall of the well 91 and an outlet 91b located at the base of the well; the hot and cold water reach said well respectively at 91c and at 91d.

The holes 93 and 94 for the inflow of hot and cold water respectively and the hole 95 for the outflow of hot, cold or mixed water are formed in the disk 92 of this variation; the hole 95 leads into the tunnel, which comprises a portion 96 shaped like a duct for direct connection to the opening 91b, and a portion 97, which leads into the section 97a which faces the opening 91a; the numeral 98 furthermore designates a terminal which is shaped like a wall and flanks the portion 96 of the tunnel up to the peripheral region of the disk.

The gasket 99 of this variation is obtained by combining the gaskets of FIGS. 20 and 21; its detailed description is thus deemed unnecessary.

Before concluding, it should be clarified that a bathtub unit has always been discussed so far only for the sake of simplicity, considering it as representative of a whole range of products constituted by wall-mounted or rim-mounted external units which can be adopted not only for bathtubs but also for different devices, such as for example washbasins or showers.

The described invention is susceptible to numerous modifications and variations, all of which are within the scope of the inventive concept; all the details may furthermore be replaced with other technically equivalent elements.

In the practical embodiment of the invention, the materials employed, as well as the shapes and dimensions, may be any according to the requirements.

I claim:

1. Device for the separate inflow of hot and cold water and for the outflow of hot, cold or mixed water in a single-control mixer cartridge particularly suitable for a bathtub unit, said bathtub unit comprising a cavity for accommodating said cartridge which is shaped like a well with a cylindrical side wall and a flat base and has, at its side wall, outlets of ducts for the inflow of hot and cold water respectively, said cavity being furthermore provided with at least one outflow opening for hot, cold or mixed water, comprising a disk which is provided with two holes for the inflow of hot and cold water respectively into the cartridge, and with a hole for the outflow of hot, cold or mixed water, and has two faces, the first face being substantially flat and arrangeable facing the cartridge, the second face being adjacently provided with a tunnel for connecting the outflow hole present in the disk to the at least one opening for the outflow of hot, cold or mixed water from the well, said tunnel forming two separate chambers together with portions of the side wall and of the base of the well; the well outlet of the hot water inflow duct and the hole for the inflow of hot water into the cartridge present in the disk are formed in the first chamber, and the well outlet of the cold water inflow duct and the hole for the inflow of cold water into the cartridge present in the disk are formed in the second chamber; a gasket comprising a circumferential part at the peripheral region of the disk and contacting the side wall of the well; portions extend monolithically from said circumferential part, and are inserted in seats formed on the walls of the tunnel and contact said side wall and the base of the well to delimit said two separate chambers; registration pins extend from said second face of the disk to fit in seats provided in the base of the well.

2. Device according to claim 1, said mixer cartridge comprising a substantially flat bottom which is provided with means for the stable coupling of a supplemental bottom, wherein the first substantially flat face of the disk, which is suitable to face the cartridge, is provided with means suitable to associate with said stable coupling means.

3. Device according to claim 1, said mixer cartridge comprising a substantially flat bottom provided with means for the stable coupling of a supplemental bottom, said means comprising a plurality of slots which pass through the thickness of the bottom and are provided with a tooth in an intermediate region of said thickness, wherein the means suitable to associate with said stable coupling means provided in the bottom of the cartridge comprise a plurality of legs, said legs extending from the face of the disk which is suitable to face the cartridge, each leg being suitable to associate, in a snap-together manner, with the tooth provided in said slots.

4. Device according to claim 1, said mixer cartridge comprising a bottom provided with registration pins which are shaped so as to form a portion of a cylindrical wall which is appropriately reduced in its outward dimension, said device further comprising, at the face of the disk which is suitable to face the cartridge, cavities for accommodating said pins, the side wall of which is complementary, over its entire extension, to that of said pins, said cavities being separated from the edge of the disk by thin walls.

5. Device according to claim 1, said mixer cartridge comprising a bottom provided with openings for the separate inflow of hot and cold water, said openings being provided with gaskets in which the perimeter of the internal surface is teardrop-shaped, wherein the holes formed in the disk for the inflow of hot and cold water respectively into the cartridge are suitable to face said openings and have, on the face of the disk, a teardrop-shaped cross--section which is complementary to the internal perimeter of said gaskets.

6. Device according to claim 1, said mixer cartridge comprising a bottom which has an opening for the outflow of hot, cold or mixed water provided with a gasket in which the perimeter of the internal surface is shaped so as to form two opposite circular arcs which are mutually blended by two other circular arcs, wherein the hole present in the disk for the outflow of hot, cold or mixed water from the cartridge faces said opening and has a cross-section in which the perimeter duplicates the internal perimeter of said gasket.

7. Device according to claim 1, said mixer cartridge comprising a cylindrical body for the containment of a fixed plate which is provided with holes for the separate inflow of hot and cold water and for the outflow of hot, cold or mixed water, and with an overlying movable plate which internally forms a mixing chamber and is suitable to assume different positions, coupled to an actuation lever which is pivoted on a rotating connector which is also contained within said body, wherein the face of the disk which is suitable to face the cartridge is provided with means for stable coupling to said body, so as to adhere to the fixed plate, the holes formed in the disk facing the corresponding holes provided in the fixed plate and being provided with sealing gaskets the shape of which is complementary to the perimeter of said plate holes.

8. Device according to claim 1, wherein said side wall of said well has a front portion and a rear portion, and wherein the tunnel comprises two aligned diametrical portions, the first portion leading toward the front portion of the side wall of the well, which is entirely delimited by walls, the second portion being open toward the base of the well and ending toward the rear portion of said side wall of the well, the gasket portions which extend monolithically from the circumferential part of said gasket being inserted in interconnected seats which are formed respectively at the edges of the tunnel outlet sections which are perpendicular to the disk, at the edge of the opening of the second tunnel portion which is directed toward the base of the well of the tunnel, and at the face of the first tunnel portion which is directed toward said base, so as to form a longitudinal segment and a transverse one.

9. Device according to claim 1, wherein said side wall of said well has a front portion and a rear portion, said bathtub unit having a single opening for the outflow of hot, cold or mixed water at the front or rear portion of the side wall of the well, wherein the tunnel has a substantially uniform diametrical arrangement at least from the outflow hole provided in the disk up to the outlet section at the outflow opening, extending in the opposite direction with a terminal shaped like a simple wall, the gasket portions which extend monolithically from the circumferential part of said gasket being inserted in interconnected seats formed respectively at the edges of the tunnel outlet section which are perpendicular to the disk, on the face of the terminal of the tunnel which is opposite to the outlet, and at the face of the tunnel directed toward the base of the well so as to form a longitudinal segment and a transverse segment.

10. Device according to claim 1, said bathtub unit having a single outflow opening for hot, cold or mixed water at the base of the well, wherein the tunnel is shaped so as to form a duct for the direct connection of the outflow hole formed in the disk to said opening, and is flanked by two diametrical walls up to the peripheral region of the disk, the gasket portions which extend monolithically from the circumferential part of said gasket being inserted in interconnected seats provided respectively at the end of the duct and on the faces of the diametrical walls directed respectively toward the side wall and toward the base of the well.

11. Device according to claim 1, wherein said side wall of said well has a front portion and a rear portion, said bathtub unit having an outflow opening for hot, cold or mixed water at the front or rear portion of the side wall and an outflow opening at the base of the well, wherein the tunnel has a substantially uniform diametrical arrangement at least from the outflow hole provided in the disk up to the outlet section at the outflow opening in the side wall, said tunnel extending in the opposite direction with a tunnel shaped like a simple wall and having an opening at the outflow opening in the base of the well, the gasket portions which extend monolithically from the circumferential part of said gasket being inserted in interconnected seats provided respectively at the edges of the tunnel outlet section which are perpendicular to the disk, at the edge of the opening toward the base of the well, on the faces of the terminal of the tunnel which are directed toward the side wall and toward the base of the well, and at the face of the tunnel which is directed toward the base of the well so as to form a longitudinal segment and a transverse segment.

12. Device according to claim 1, wherein said side wall of said well has front portion and rear portions, said bathtub unit having an opening for the outflow of hot, cold or mixed water at the front and rear portions of the side wall of the well, wherein the tunnel has a substantially uniform diametrical arrangement between the two outlet sections at said outflow openings, the gasket portions which extend monolithically from the circumferential part of said gasket being inserted in interconnected seats formed respectively at the edges of the two tunnel outlet sections which are perpendicular to the disk and, so as to form a longitudinal segment and two transverse segments, at the face of the tunnel which is directed toward the base of the well.

13. Device according to claim 1, wherein all the walls of the gasket which are meant to make contact with the bottom of the seats and with the circumferential edge of the disk belong to a single ideal frustum-shaped surface which corresponds to the continuous frustum-shaped surface of a punch which acts in combination with a gasket forming mold, the remaining walls which extend from said walls being shaped so as to allow extraction of the gasket from the mold.

* * * * *